United States Patent

[11] 3,592,272

[72] Inventor Felix A. Perez
 631 Manila Way, Colma, Calif. 94105
[21] Appl. No. 783,607
[22] Filed Dec. 13, 1968
[45] Patented July 13, 1971

[54] MULTIPURPOSE GARDEN TOOL
 2 Claims, 4 Drawing Figs.
[52] U.S. Cl. .................................................. 172/375,
 172/380, 56/400.05, 7/14.55, 294/51
[51] Int. Cl. ............................................... A01b 1/20
[50] Field of Search........................................... 172/375,
 371, 380, 378; 56/400.04, 400.05; 294/49.51;
 7/14.55

[56] References Cited
 UNITED STATES PATENTS
| 2,018,591 | 10/1935 | Angel | 172/375 |
| 215,077 | 5/1879 | Stone | 172/375 |
| 671,107 | 4/1901 | Douglas | 172/375 X |
| 1,055,044 | 3/1913 | Hollander | 7/14.55 |
| 1,529,781 | 3/1925 | Foster | 172/371 |
| 2,040,751 | 5/1936 | Marseilles | 172/380 X |

Primary Examiner—Robert E. Pulfrey
Assistant Examiner—Stephen C. Pellegrino
Attorney—Stanley Bialos ABSTRACT: A multipurpose garden tool adapted for spading, shoveling, edge trimming, hoeing, weeding, tilling, backfilling and other gardening operations, comprises a substantially flat plate working part of generally rectangular configuration, and a handle part rigidly connected to the top edge of said plate part medially thereof. The plate part is provided with raking teeth on the top edge at one side of the handle part. One side edge has a relatively straight and flat top portion, and the opposite side edge is a convexly curved cutting edge between the top and bottom edges. The flat portion joins a convexly curved corner cutting edge adjacent the bottom edge which is also a knife edge. Advantageously, all the edge portions between the straight portion on said side edge and the side of the handle part opposite the teeth are a substantially continuous knife edge. The convexly curved side edge is suitable for use as an axe for chopping into the ground, while the bottom knife edge is useful for digging purposes and spading, while the rounded corner at the straight portion of one side edge is useful for edge trimming. The teeth are suitable for uprooting and raking. The handle part rigid with the flat working part is of a length which enables ready grasping with the hands for close work, and means for detachable connection with a handle rod that enables the tool to be used with the user standing in upright position.

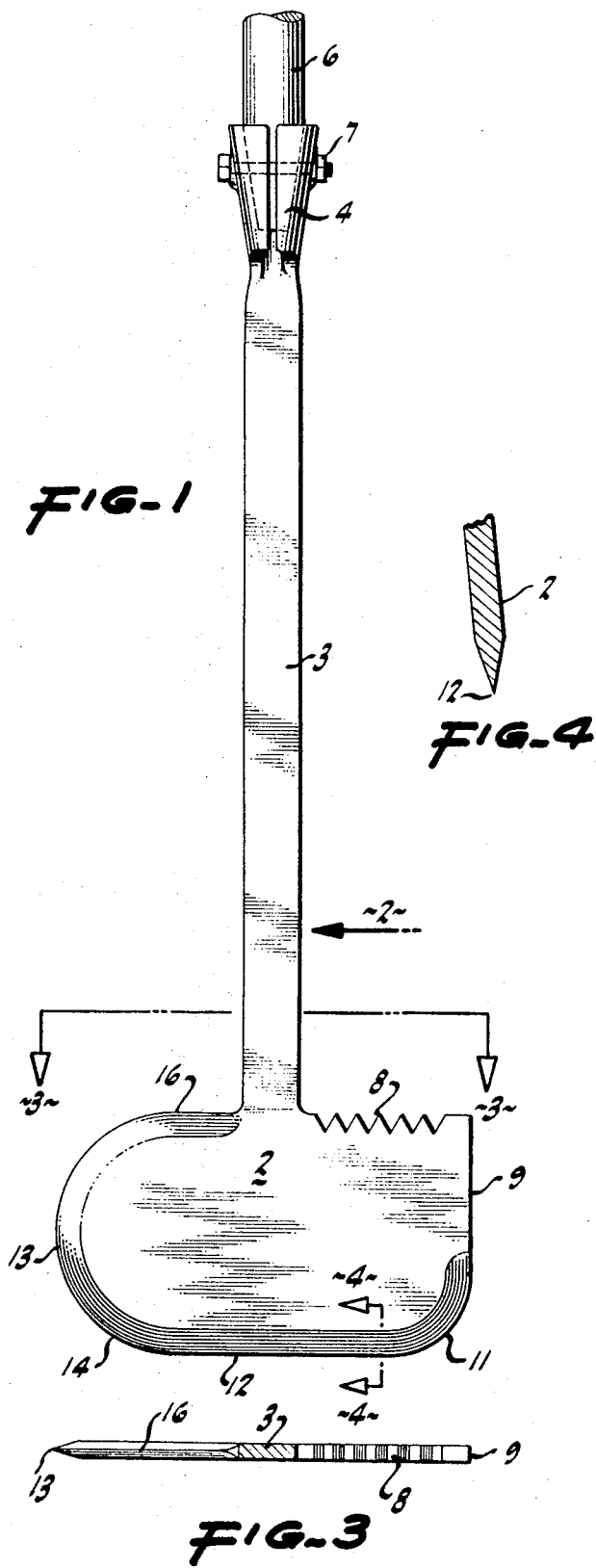
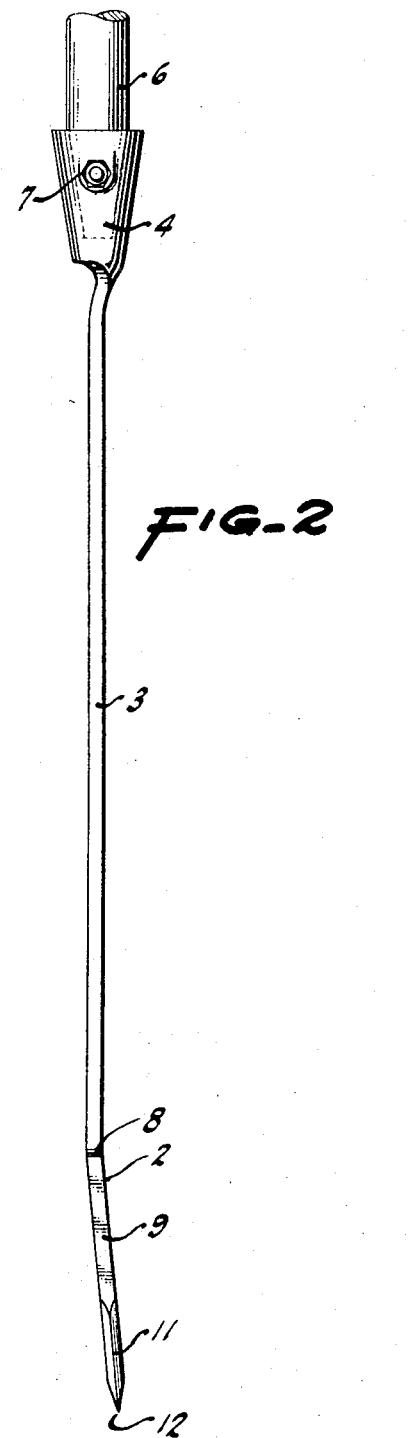
INVENTOR.
FELIX A. PEREZ
BY Stanley Bialos
ATTORNEY

MULTIPURPOSE GARDEN TOOL

This invention relates to a multipurpose gardening tool which has a variety of uses.

Summarizing the same, the tool comprises a relatively flat working part of generally rectangular outline having a bottom edge, a top edge and opposite side edges. Rigidly connected to the top edge medially thereof is a handle part integral with the flat working part, and which is of a length enabling the tool to be manipulated with the hands while the worker is kneeling on the ground or bending over near the ground. This handle part has means for detachable connection to a detachably mounted handle rod enabling the tool to be manipulated with the user in upright position.

The top edge at one side of the integral handle part is serrated to provide teeth for raking, and the bottom edge is a knife edge. One side edge is convexly curved and has a cutting edge portion at the corner adjacent the bottom edge. Similarly, the opposite side edge at the corner with the bottom edge is convexly curved to provide a knife edge portion adapted for edge trimming.

The latter curved portion is joined to a straight part on the side edge which is useful for alignment purposes, and desirably this straight part is flat to enable ready tamping around plants or the like. Advantageously, the entire portion of the tool between the flat part on said one side edge and the handle at the side of the convexly curved side edge is one continuous cutting edge.

From the preceding, it is seen that the invention has as its objects, among others, the provision of an improved multipurpose gardening tool which is useful for spading, shoveling, edging, raking, hoeing, weeding or the like and which is of simple and economical construction, and easy to manipulate. Other objects will become apparent from a perusal of the following more detailed description and accompanying drawing in which:

FIG. 1 is an elevational view of the face of the tool;

FIG. 2 is a side elevational view looking in the direction of arrow 2 in FIG. 1;

FIG. 3 is a horizontal sectional elevation taken in the plane indicated by line 3—3 in FIG. 1, and;

FIG. 4 is a fragmentary section taken in a plane indicated by line 4—4 in FIG. 1.

In greater detail, the tool comprises a flat plate which provides a working part 2 of generally rectangularly shaped outline. Rigidly connected medially to the top edge of working part 2 is an integral handle part 3; the parts being of any suitable metal such as steel.

The top of handle part 3 has a socket portion 4 in which may be detachably connected a handle rod 6 of wood or any other suitable material, to permit the tool to be manipulated with the worker standing in substantially upright position; the connection between socket portion 4 and handle rod 6 being a detachable bolt and nut connection 7.

At one side of the handle part 3, the top edge is serrated to form teeth 8 which are suitable for raking. The side edge adjacent teeth 8 is a substantially flat portion 9 which joins a convexly curved corner portion 11 which is bevelled to provide a cutting edge. This corner portion is joined to a straight bottom edge portion 12 which is also bevelled to provide a cutting edge, while the side edge 13 is also a cutting edge joined to bottom edge 12 so that there is a rounded or curved cutting edge corner portion 14 at the bottom edge.

Desirably, the side 16 of the top edge opposite serrated part 8 is also a cutting edge. Thus, all portions between the lower end of the substantially straight part 9 and the side of the handle part opposite teeth 8 are a substantially continuous cutting edge.

As indicated in FIG. 2 working part 2 is inclined relative to handle part 3 which facilitates use of bottom cutting edge 12 for spading purposes and hoeing. A suitable angle is about 170° although this angle is not particularly critical, a range of about 165°—173° being a suitable range.

Working part 2 is desirably relatively small to provide easy manipulation thereof. A suitable size is 4 inches in lateral width between side edges 9 and 13, and about 3 inches in height between the bottom and top edges. Handle part 3 is advantageously about 9 to 15 inches long, and desirably about 12 inches to enable manipulation of the tool with the hands should the operator be bending down or kneeling, and not require using detachable handle rod 6.

Convexly curved side edge 13 is very useful as an axe edge for chopping into the ground or for chopping weeds or plants to be removed. Cutting portion 16 of the top edge can be employed to cut stubble and weeds by pulling them against handle 3. Curved cutting edge portion 11 provides an excellent cutter for edge trimming namely, removal of grass between a cement or the like sidewalk and a lawn; and in this connection, during such use, flat portion 9 provides a support for bearing against the ground while the corner portion 11 is edge trimming. Corner portion 14 can also be used for edge trimming.

Also, flat portion 9 provides a means for aligning the tool against any planar surface such as a wall when bottom edge 12 is used for digging. Serrated teeth 8 are very useful in back raking namely, removing tufts of grass that are free, or may remain along the edge of a lawn adjacent a sidewalk which has been trimmed, and for raking up loose particles of weed or grass that may remain on the ground.

I claim:

1. A multipurpose garden tool comprising a substantially flat plate member of generally rectangular shape, having a bottom edge, a top edge substantially parallel to said bottom edge, and opposite side edges; a handle part rigidly attached to said top edge between said side edges and extending upright from said top edge; the portions of said top edge at each side of said handle part being in substantially horizontal alignment and substantially the same distance from said bottom edge; one of said top edge portions being serrated to provide raking teeth, the top ends of which are substantially in horizontal alignment with the other top edge portion; the side edge adjacent said teeth being substantially flat and the opposite side edge being convexly curved; the corner of said plate member adjacent the bottom of said substantially flat side edge is a convexly curved cutting edge continuing from said bottom cutting edge, and said bottom edge, said convexly curved side edge and a portion of said top edge adjacent said convexly curved side edge being a substantially continuous cutting edge.

2. The tool of claim 1 wherein said handle part in inclined relative to said flat plate member at an angle of about 165°—173° and has means at the top thereof to provide for connection to an extension handle to enable the tool to be manipulated by a worker while he is standing in substantially upright position.